(12) United States Patent
Schierle-Arndt et al.

(10) Patent No.: US 9,887,027 B2
(45) Date of Patent: Feb. 6, 2018

(54) CORROSION INHIBITORS FOR $FE_2P$ STRUCTURE MAGNETOCALORIC MATERIALS IN WATER

(71) Applicant: BASF SE, Ludwigshafen (DE)

(72) Inventors: Kerstin Schierle-Arndt, Zwingenberg (DE); Fabian Seeler, Weinheim (DE); Markus Schwind, Ludwigshafen (DE); Jerome Francois, La Courneuve (FR)

(73) Assignee: BASF SE, Ludwigshafen (DE)

( * ) Notice: Subject to any disclaimer, the term of this patent is extended or adjusted under 35 U.S.C. 154(b) by 46 days.

(21) Appl. No.: 15/025,129

(22) PCT Filed: Sep. 25, 2014

(86) PCT No.: PCT/EP2014/070479
§ 371 (c)(1),
(2) Date: Mar. 25, 2016

(87) PCT Pub. No.: WO2015/044263
PCT Pub. Date: Apr. 2, 2015

(65) Prior Publication Data
US 2016/0314883 A1    Oct. 27, 2016

(30) Foreign Application Priority Data
Sep. 27, 2013    (FR) ..................... 13 59379

(51) Int. Cl.
| | | |
|---|---|---|
| *C09K 5/00* | (2006.01) | |
| *H01F 1/44* | (2006.01) | |
| *C23F 11/18* | (2006.01) | |
| *F25B 21/00* | (2006.01) | |
| *C23F 11/08* | (2006.01) | |
| *C23F 11/14* | (2006.01) | |
| *C23F 11/167* | (2006.01) | |
| *H01F 1/01* | (2006.01) | |

(52) U.S. Cl.
CPC .............. *H01F 1/442* (2013.01); *C23F 11/08* (2013.01); *C23F 11/149* (2013.01); *C23F 11/1676* (2013.01); *C23F 11/187* (2013.01); *C23F 11/188* (2013.01); *F25B 21/00* (2013.01); *H01F 1/015* (2013.01); *F25B 2321/002* (2013.01); *Y02B 30/66* (2013.01)

(58) Field of Classification Search
CPC .............. C09K 5/00; F25B 21/02; F25B 21/00
See application file for complete search history.

(56) References Cited

U.S. PATENT DOCUMENTS

| | | | |
|---|---|---|---|
| 3,638,440 A * | 2/1972 | Lawless .................. | F25B 21/00 62/3.1 |
| 8,211,326 B2 | 7/2012 | Brueck et al. | |
| 9,318,245 B2 * | 4/2016 | Seeler ..................... | H01F 1/015 |
| 2007/0220907 A1 | 9/2007 | Ehlers | |
| 2011/0037342 A1 | 2/2011 | Degen et al. | |
| 2012/0032105 A1 | 2/2012 | Seeler et al. | |
| 2012/0286196 A1 | 11/2012 | De Kimpe et al. | |
| 2014/0157793 A1 * | 6/2014 | Johnson ................... | C09K 5/00 62/3.1 |

FOREIGN PATENT DOCUMENTS

| | | |
|---|---|---|
| CN | 101514458 A | 8/2009 |
| WO | 2004/068512 A1 | 8/2004 |
| WO | 2006/074790 A1 | 7/2006 |
| WO | 2009/133049 A1 | 11/2009 |
| WO | 2011/083446 A1 | 7/2011 |
| WO | 2011/111004 A1 | 9/2011 |

OTHER PUBLICATIONS

International Search Report dated Dec. 12, 2014, in PCT/EP2014/070479 Filed Sep. 25, 2014.

* cited by examiner

*Primary Examiner* — John Hardee
(74) *Attorney, Agent, or Firm* — Oblon, McClelland, Maier & Neustadt, L.L.P.

(57) ABSTRACT

Use of a composition (A) having a pH of at least 8 at 25° C. containing at least 50 wt.-% of water or a water containing solvent mixture, at least 0.1 mol/m3 of at least one water soluble silicate, optionally at least one molybdate, optionally at least one phosphonate, optionally at least one azole, optionally at least one additional freezing point depressing salt, optionally at least one phosphate, and optionally at least one nitrate, as heat carrier medium for magnetocaloric materials of formula (I) $(A_yB_{1-y})_{2+u}C_wD_xE_z$ (I) where: A is Mn or Co, B is Fe, Cr or Ni, C is Ge, As or Si, D is different from C and is selected from P, B, Se, Ge, Ga, Si, Sn, N, As and Sb, E may be same or different from C and D and is selected from P, B, Se, Ge, Ga, Si, Sn, N, As and Sb.

21 Claims, No Drawings

CORROSION INHIBITORS FOR FE$_2$P STRUCTURE MAGNETOCALORIC MATERIALS IN WATER

The invention relates to the use of corrosion-stabilizing additives in heat carrier media which are in direct contact with magnetocaloric materials and to refrigeration systems, climate control units, heat pumps and magnetocaloric generators.

Magnetocaloric materials, also referred to as thermomagnetic materials, can be used in refrigeration systems, climate control units, heat pumps and magnetocaloric generators.

In a material which exhibits a magnetocaloric effect ("MCE"), the alignment of randomly aligned magnetic moments by an external magnetic field leads to heating of the material. This heat can be removed from the MCE material to the surrounding atmosphere by a heat transfer. When the magnetic field is then switched off or removed, the magnetic moments revert back to a random arrangement, which leads to cooling of the material below ambient temperature. Systems using the magnetocaloric effect cover a broad range of practical applications, from thermomagnetic devices wherein the machine converts thermal energy into magnetic work, to heat pumps wherein magnetic work is used to transfer thermal energy from a cold source to a hot sink or vice versa. The former type includes devices that use in a second step the magnetic work: to produce electricity (generally referred to as thermomagnetic, thermoelectric and pyromagnetic generators) or to create a mechanical work (like thermo-magnetic motors). Such devices are summarized as magnetocaloric generators hereinafter. While the latter type corresponds to magnetic refrigerators, heat exchangers, heat pumps or air conditioning systems. A description of the magnetocaloric effect used for cooling purposes can also be found in Nature, Vol. 415, Jan. 10, 2002, pages 150 to 152. Usually, a fluid heat carrier medium such as water is used for heat transfer from and to the magnetocaloric material.

Magnetocaloric materials which are especially well-suited for magnetocaloric cooling purposes are materials showing the Fe$_2$P crystal structure. Such materials are known in principle and are described, for example, in WO 2004/068512. The Curie temperature of these Fe$_2$P-based materials can be varied over a wide range within the interesting temperature range by small variation of the stoichiometric ratios of the components. Furthermore, these materials can be prepared to exhibit only very small thermal hysteresis.

All MCE applications previously cited have a cyclic character, i.e. the magnetocaloric material runs through the magnetic phase transition frequently, and consequently stays in constant contact with the heat carrier medium for heat transfer. For a long working life of the magnetocaloric material, it is thus important to ensure that the magnetocaloric material is not affected adversely by the heat carrier medium.

An especially preferred heat carrier medium is water since it is non-toxic, has a high specific heat capacity, low viscosity and is easily available at low costs.

A problem using a heat exchange medium or heat transfer medium is the corrosion tendency of the magnetocaloric materials. Attempts are being made in different ways to prevent this corrosion. Corrosion is also referred to as fouling or leaching. Specifically the washout of toxic metals such as arsenic or manganese is problematic. In general, the application properties of the magnetocaloric materials suffer as a result of corrosion, fouling or leaching.

Different classes of magnetocaloric materials are composed of different chemical elements and have different physical and chemical properties, e.g. can be more metallic and ductile or less metallic and more brittle, have different stability against different chemicals/chemical agents. Since magnetocaloric materials are intermetallic compounds composed of different elements, the binding states and binding energies may be very different. This means, even for the same element in different classes of magnetocaloric materials, the electrochemical potential, the electron densities and, thus, the elements reactivity may vary strongly. Furthermore, every class of magnetocaloric material will have different secondary phases, which may form during production of the wanted main phase.

One approach to solve the problem of corrosion, fouling or leaching is to prevent the direct contact of the heat carrier medium with the magnetocaloric material, e.g. by coating the magnetocaloric material with a protecting layer, see for example US 2007/0220907. One disadvantage of this approach is that the coating worsens the heat transfer between the magnetocaloric material and the heat carrier medium, other disadvantages are the additional process step of preparing the coating and the weight added to the magnetocaloric material.

Another approach is the addition of corrosion inhibitors to the heat transfer medium. CN 101514458 describes water-based heat transfer media containing molybdate, orthophosphate and silicate as corrosion inhibitors for La, Fe, Si based magnetocaloric materials. La, Fe, Si based magnetocaloric materials crystallize in NaZn$_{13}$-type, which is a cubic structure. Fe is typically the predominant atomic species in this material. Si, La and other doping elements compose only a minor part.

In Fe$_2$P-based magnetocaloric materials, the ratio of contained elements and dopants can vary in a wide range. Furthermore, surface analysis of Fe$_2$P-based magnetocaloric materials shows that the presence of elemental species on the surface is often very different from the distribution in the bulk, e.g. at the surface of a Fe$_2$P-based magnetocaloric material consisting of Mn, Fe, Si and P Mn is found to the largest extent, Si and Fe are present to a much smaller extend but still to a larger extend than P as can be shown by XPS measurements. This means that Fe is not the predominant atomic species. A corrosion inhibitor for Fe$_2$P-based magnetocaloric materials, therefore, has to protect many different elemental species from corrosion.

US 2012/0032105 relates to the use of alcohols, alcoholamines, diols, polyols as anticorrosive agents in aqueous heat carrier media for magnetocaloric materials of different kinds, inter alia magnetocaloric materials of the Fe$_2$P-type.

It is important to find the suited heat carrier medium for a special magnetocaloric material and for the target application resulting in a long working life of the magnetocaloric application and showing good working properties in respect to the transfer of heat like high heat capacity, low viscosity and applicability in the desired temperature range. Additionally the effect of the heat carrier medium on the other parts of the magnetocaloric device to which the heat carrier medium is direct contact like tubes and pumps should be considered.

It is an object of the present invention to provide aqueous heat carrier media for Fe$_2$P-based magnetocaloric materials which have little corrosive effect on the magnetocaloric materials. Preferably the heat carrier media should have little corrosive effect on the other parts of the magnetocaloric device as well. It is a further object of the present invention to provide such aqueous heat carrier media which are usable in temperature ranges near to and below the freezing point of water to enable its application in magnetic cooling devices, e.g. near and around 0° C. as present in refrigerators, but also well below 0° C. like −20 to −30° C. as present in freezers. On the other hand it may be important for cooling applications like refrigerators, freezers and air-conditioning (especially in automotive applications in the summer), that the heat carrier medium shows good properties at higher temperatures like 30 to 60° C., too. The hot end of a magnetocaloric cooing unit is in contact with the environment thereby transferring the heat generated within the magnetocaloric cooling unit to the environment. Depending on climate and particular circumstances the temperature of the environment may reach 30 to 60° C.

The object is achieved in accordance with the invention by use of a composition (A) having a pH of at least 8 at 25° C. containing (a1) based on the total weight of composition (A) at least 50 wt.-% of water or a water containing solvent mixture wherein the solvent mixture contains at least 90 wt.-% of water, based on the total weight of (a1); and
(a2) at least 0.1 mol/m³ of at least one water soluble silicate,
(a3) optionally at least one molybdate,
(a4) optionally of at least one phosphonate,
(a5) optionally at least one azole,
(a6) optionally at least one additional freezing point depressing salt,
(a7) optionally at least one phosphate, and
(a8) optionally at least one nitrate,
wherein mol/m³ are based on the total volume of the composition (A),
as heat carrier medium for magnetocaloric materials selected from compounds of formula (I)

$$(A_yB_{1-y})_{2+u}C_wD_xE_z \quad (I)$$

where
A is Mn or Co,
B is Fe, Cr or Ni,
C is Ge, As or Si,
D is different from C and is selected from P, B, Se, Ge, Ga, Si, Sn, N, As and Sb,
E may be same or different from C and D and is selected from P, B, Se, Ge, Ga, Si, Sn, N, As and Sb,
u is a number in the range from −0.1≤u≤0.1,
y is number in the range of 0<y<1,
w, x are numbers in the range of 0<w, x<1,
z is a number in the range of 0≤z<1, and
w+x+z=1;
wherein composition (A) is brought into direct contact with the magnetocaloric materials.

This object is further achieved by refrigeration systems, climate control units, heat pumps and magnetocaloric generators comprising at least one magnetocaloric material of formula (I) and composition (A) as heat carrier medium being in direct contact with the magnetocaloric material.

It has been found in accordance with the invention that the corrosion of the magnetocaloric materials of formula (I) can be greatly reduced when silicates are added to the aqueous heat carrier media. The addition of one or more of components (a3) to (a8) increases the corrosion stability of the magnetocaloric material against the heat carrier medium. The presence of at least one freezing point depressing salt in the heat carrier medium which is in contact with magnetocaloric materials allows its application at temperatures in the range of about −30° C. up to +60° C., the lower limit may be extended even more up to −60° C., depending on the amount of salts present in the heat carrier medium.

In the following the invention is described in detail.

The pH of composition (A) used as heat carrier medium is at least 8, preferably the pH is in the range of from 8 to 12, more preferred the pH of composition (A) is in the range of from 9 to 11, and most preferred in the range of from 9 to 10, measured at 25° C. The pH of composition (A) may be adjusted by the addition of bases like NaOH and KOH. The pH may also be adjusted by the presence of buffers like $NaH_2PO_4/Na_2HPO_4$, $NaHCO_3/Na_2CO_3$ and the like.

Composition (A) used as heat carrier medium is fluid at its working temperature, i.e. it can be pumped through the magnetocaloric material during operation of the magnetocaloric application.

Composition (A) contains at least 50 wt.-% of component (a1), preferably at least 60 wt.-% and more preferred at least 80 wt.-% (a1), based on the total weight of composition (A).

Component (a1) is water or a water containing solvent mixture wherein the solvent mixture contains at least 90 wt.-% of water, based on the total weight of (a1), preferably component (a1) is water.

The solvents which may be used in the solvent mixture are selected from water miscible solvents, i.e. the water miscibility of the solvents should be sufficiently great as to give rise to a homogeneous mixture or solution at the desired mixing ratio with water. If only small amounts of solvent are envisaged, it is possible to switch to lower water miscibility solvents. At higher solvent contents, good water miscibility should be ensured. The solvent mixture may contain one, two or more solvents in addition to the water. Preferably the solvents are organic solvents. Suitable solvents are alcohols, alcoholamines, diols and polyols.

The alcohols used are preferably $C_{1-6}$-alkanols, more preferably methanol, ethanol, n-propanol, 2-propanol or mixtures thereof.

Preferred alcoholamines are $C_{1-6}$-alkanolamines, especially ethanolamine.

The diols used are preferably $C_{2-6}$-alkanediols, especially ethylene glycol, propylene glycol, butanediol or mixtures thereof.

Particularly preferred polyols have an aliphatic hydrocarbon radical having 3 to 6 hydroxyl groups. The aliphatic hydrocarbon radical contains preferably 3 to 6 C-atoms.

Particular preference is given to using ethanol and glycol.

In one embodiment the water containing solvent mixture is a mixture of water with one or more solvents selected from water miscible $C_{1-6}$-alkanols, $C_{1-6}$-alkanolamines, $C_{2-6}$ alkanediols and polyols having an aliphatic hydrocarbon radical with 3 to 6 hydroxyl groups.

Composition (A) contains at least 0.1 mol/m³ of at least one water soluble silicate as component (a2), preferably composition (A) contains 0.1 to 2500 mol/m³. The silicate (a2) may be used predominantly in respect to its corrosion inhibition effect, in this case the preferred range is 0.1 to 100 mol/m³, more preferred 0.1 to 20 mol/m³ and most preferred 1 to 10 mol/m³ of at least one water soluble silicate (a2). It is also possible to use the silicate (a2) at higher concentrations, e.g. at a concentration of at least 150 mol/m³. This and higher concentrations of silicate have the additional advantage to lead to a decreased freezing point of composition (A) allowing its use at temperatures around and below the freezing point of the pure component (a1), e.g. in case of water below 0° C. and as low as ca. −30° C.

The concentration ranges of components (a2) to (a8) are given in mol/m³, which is based in each case on the total volume of composition (A).

The term "water soluble silicate" means that the silicates are present in composition (A) in a solvated form. Preferred silicates (a2) are selected from $Na_2O.nSiO_2$, $K_2O.nSiO_2$, $Li_2O.nSiO_2$, $Rb_2O.nSiO_2$, and $Cs_2O.nSiO_2$ with $1 \leq n \leq 4$, wherein the silicates may be hydrated. Preferred are $Na_2O.nSiO_2$ and $K_2O.nSiO_2$, most preferred is $Na_2O.nSiO_2$. Alkali silicate solutions contain, in addition to alkali ions, hydroxide ions and orthosilicate ($H_xSiO_4^{(4-x)-}$) ions a wide variety of linear, cyclic, and highly crosslinked polysilicate ions. It is possible to use one silicate, or a combination of two or more.

Composition (A) may contain at least one molybdate (a3). Suitable molybdates are water soluble mono- and dimolybdates and isopolymolybdates. Simple molybdates like sodium molybdate contain the tetrahedral $[MoO_4]^{2-}$ ion. Isopolymolybdates are based on linked distorted $[MoO_6]$ octahedra. Suited molybdates according to the invention are $Na_2MoO_4$, $K_2MoO_4$, $Li_2MoO_4$, $Rb_2MoO_4$, $MgMoO_4$, $Cs_2MoO_4$, and ammoniummolybdates like $(NH_4)_2MoO_4$ and $(NH_4)_6Mo_7O_{24}$, preferred are $Na_2MoO_4$ and $K_2MoO_4$, especially preferred is $Na_2MoO_4$. The molybdates used may contain crystal water, e.g. $Na_2MoO_4.2H_2O$. If at least one molybdate (a3) is present, composition (A) usually contains at least 0.1 mol/m$^3$ (a3), preferably 0.1 to 100 mol/m$^3$ (a3), more preferred it contains 0.1 to 10 mol/m$^3$ and most preferred 0.5 to 2.5 mol/m$^3$ of at least one molybdate (a3). It is possible to use one molybdate, or a combination of two or more.

Composition (A) may further contain at least one phosphonate (a4). Suitable phosphonates are 2-hydroxy phosphonoacetic acid ("HPAA"; CAS 23783-26-8); 2-phosphonobutane-1,2,4-tricarboxylic acid ("PBTC"; CAS 37971-36-1); amino tris(methylene phosphonic acid) ("ATMP"; CAS 6419-19-8); and 1-hydroxyethylidene-1,1-diphosphonic acid ("HEDP"; CAS 2809-21-4). Preferred are HPAA and PBTC, especially preferred is HPAA. The phosphonates may be added in form of the acid or in form of a corresponding salt, especially as alkaline or ammonium salt. If at least one phosphonate (a4) is present, composition (A) usually contains at least 0.01 mol/m$^3$, preferably 0.01 to 10 mol/m$^3$, more preferred contains 0.01 to 2 mol/m$^3$ and most preferred composition (A) contains 0.05 to 1.5 mol/m$^3$ of at least one phosphonate (a4). It is possible to use one phosphonate, or a combination of two or more.

Composition (A) may further contain at least one azole (a5). The term "azole" means within this description an optionally substituted aromatic compound composed of a 5-membered heterocycle fused to a benzene cycle. The compound may be substituted by one or more $C_1$-$C_4$ alkyl groups, OH or SH. The 5-membered heterocycle may contain 1 to 3 hetero atoms selected from N and S, preferable the 5-membered heterocyclic part of the azole contains 2 to 3 heteroatoms selected from N and S. The azoles may be present in neutral form or in form of their corresponding salts. Suitable azoles are tolyltriazole (CAS 29385-43-1); 1,2,3-benzotriazole (CAS 95-14-7); 1H-benzotriazole, 6 (or 7)-methyl-, sodium salt (1:1) (CAS 64665-57-2); 2-mercaptobenzothiazole (CAS 149,30,4); and the sodium salt of 2-mercaptobenzothiazole (CAS 2492-26-4), preferred are tolyltriazole and 1,2,3-benzotriazole, especially preferred is tolyltriazole. It is possible to use one azole, or a combination of two or more. If one or more azoles are present, composition (A) usually contains at least 0.01 mol/m$^3$, preferably 0.01 to 100 mol/m$^3$, more preferred 0.01 to 5 mol/m$^3$ and most preferred 0.1 to 2 mol/m$^3$ of at least one azole (a5).

Composition (A) may further contain at least one additional freezing point depressing salt (a6). Freezing point depressing salts are intended to mean salts added to composition (A) to decrease the freezing point of the composition. The addition of freezing point depressing salts has the advantage of allowing the use of composition (A) at temperature around and/or below the freezing point of component (a1). This is very desirable for magnetic cooling applications around 0° C., the freezing point of water. Suitable compounds for use as freezing point depressing salts (a6) are sodium acetate, potassium acetate, sodium formate, potassium formate, sodium adipate and potassium adipate, preferred are sodium acetate, potassium acetate, sodium formate and potassium formate, more preferred are sodium acetate and sodium formate. It is possible to use one freezing point depressing salt, or a combination of two or more. If one or more freezing point depressing salts (a6) are present in composition (A), composition (A) usually contains at least 150 mol/m$^3$ of at least one freezing point depressing salt (a6), preferred 150 to 5000 mol/m$^3$, more preferred 150 to 2500 mol/m$^3$ and most preferred 150 to 1000 mol/m$^3$. It is possible to use one freezing point depressing salt, or a combination of two or more. The addition of one or more freezing point depressing salts has the advantage to result in a decreased freezing point of the heat carrier medium without a too large increase of the viscosity. Furthermore, the addition of a freezing point depressing salt is cost efficient.

Composition (A) may further contain at least one phosphate (a7). The phosphates are preferably selected from orthophosphates, pyrophosphates and polyphosphates, more preferred from orthophosphates. The at least one phosphate (a7) may be added in form of the acid or in form of a corresponding salt, especially as alkaline or ammonium salt. For example, $PO_4^{3-}$ (orthophosphate) may be added as acid $H_3PO_4$ (orthophosphoric acid) to composition (A) or as a corresponding salt like $Na_3PO_4$, $Na_2HPO_4$, and/or $NaH_2PO_4$. The orthophosphates are preferably selected from $Zn_3(PO_4)_2$, $Na_3PO_4$, $Na_2HPO_4$, $NaH_2PO_4$, $K_3PO_4$, $K_2HPO_4$, $KH_2PO_4$, $(NH_4)_3PO_4$, $(NH_4)_2HPO_4$, $(NH_4)H_2PO_4$, and $H_3PO_4$. The pyrophosphates are preferably selected from sodium and potassium pyrophosphate, the polyphosphates are preferably sodium hexametaphosphate. $Zn_3(PO_4)_2$ may be hydrated, i.e. $Zn_3(PO_4)_2.4H_2O$. Especially preferred the phosphate (a7) is an orthophosphate selected from $Na_3PO_4$, $Na_2HPO_4$, $NaH_2PO_4$, $K_3PO_4$, $K_2HPO_4$, $KH_2PO_4$, $(NH_4)_3PO_4$, $(NH_4)_2HPO_4$, $(NH_4)H_2PO_4$, and $H_3PO_4$. It is possible to use one phosphate (a7), or a combination of two or more. If at least one phosphate (a7) is present, composition (A) usually contains at least 0.1 mol/m$^3$, preferably 0.1 to 100 mol/m$^3$, more preferred 0.1 to 10 mol/m$^3$ and most preferred 0.1 to 2 mol/m$^3$ phosphate (a7).

Composition (A) may further contain at least one nitrate (a8). Suited nitrates are $LiNO_3$, $NaNO_3$, $KNO_3$, $RbNO_3$, $NH_4NO_3$, $Mg(NO_3)_2$, $Ca(NO_3)_2$, $Sr(NO_3)_2$, and $Zn(NO_3)_2$. Preferably, the at least one nitrate (a8) is selected from $NaNO_3$, $KNO_3$, $NH_4NO_3$, $Mg(NO_3)_2$, $Ca(NO_3)_2$, more preferred the at least one nitrate (a8) is selected from $NaNO_3$, $KNO_3$, and $NH_4NO_3$. It is possible to use one nitrate, or a combination of two or more. If one or more nitrates are present, composition (A) usually contains at least 0.1 mol/m$^3$ (a8) preferably 0.1 to 100 mol/m$^3$ (a8), more preferred it contains 0.1 to 10 mol/m$^3$ and most preferred 0.5 to 2.5 mol/m$^3$ of at least one nitrate (a8).

Depending on the pH of composition (A), the amount of bases and/or acids added, the amount of the other components etc. the ionic compounds present in composition (A) like silicates, phosphates, phosphonates, and molydates may be present in a form or state different from the form or state in which they were added to composition (A). E.g. it is possible to add orthophosphate in form of $H_3PO_4$ which transforms into the anion $PO_4^{3-}$ if a sufficient amount of a base like NaOH is added. Or to add 2-hydroxyphosphono acetic acid which transfers into the corresponding anion in composition (A).

All components (a2) to (a8) may be added as aqueous solutions to composition (A).

According to one embodiment of the invention the overall concentration of components (a2), (a3), (a4), (a5), (a6), (a7), and (a8) in composition (A) is at least 150 mol/m$^3$, preferably the overall concentration is at least 250 mol/m$^3$. This has the advantage, that the freezing point of composition (A) is decreased markedly in respect to the freezing point of the pure solvent component (a1).

Composition (A) having a pH of at least 8 at 25° C. preferably contains
(a1) based on the total weight of composition (A) at least 50 wt.-% of water or a water containing solvent mixture wherein the solvent mixture contains at least 90 wt.-% of water, based on the total weight of the solvent mixture (a1); and
(a2) 0.1 to 2500 mol/m$^3$ of at least one water soluble silicate,
(a3) optionally 0.1 to 100 mol/m$^3$ of at least one molybdate,
(a4) optionally 0.01 to 10 mol/m$^3$ of at least one phosphonate,
(a5) optionally 0.01 to 100 mol/m$^3$ of at least one azole, and
(a6) optionally 200 to 5000 mol/m$^3$ of at least one additional freezing point depressing salt,
(a7) optionally 0.1 to 100 mol/m$^3$ of at least one phosphate, and
(a8) optionally 0.1 to 100 mol/m$^3$ of at least one nitrate
wherein mol/m$^3$ are based on the total volume of the composition (A).

Composition (A) contains at least water or a water containing solvent mixture (a1) and at least one water soluble silicate (a2), and optionally one or more compounds selected from the at least one molybdate (a3), the at least one phosphonate (a4), the at least one azole (a5), the at least one additional freezing point depressing salt (a6), the at least one phosphate (a7) and/or the at least one nitrate (a8) as described above in detail. In addition to (a1) and (a2) composition (A) may contain different combinations of the components (a3) to (a8) as described below.

For example, composition (A) may contain components (a1), (a2) and (a3); or components (a1), (a2) and (a4); or components (a1), (a2) and (a5); or components (a1), (a2) and (a6); or components (a1), (a2) and (a7), or components (a1), (a2) and (a8).

It is also possible that composition (A) contains components (a1), (a2), (a3) and (a4); or components (a1), (a2), (a3) and (a5); or components (a1), (a2), (a3) and (a6); or components (a1), (a2), (a3) and (a7); or components (a1), (a2), (a3) and (a8); or components (a1), (a2), (a4) and (a5); or components (a1), (a2), (a4) and (a6); or components (a1), (a2), (a4) and (a7); or components (a1), (a2), (a4) and (a8); or components (a1), (a2), (a5) and (a6); or components (a1), (a2), (a5) and (a7); or components (a1), (a2), (a5) and (a8); or components (a1), (a2), (a6) and (a7) or components (a1), (a2), (a6) and (a8) or components (a1), (a2), (a7) and (a8).

Furthermore, composition (A) may contain components (a1), (a2), (a3), (a4) and (a5); or components (a1), (a2), (a3), (a4) and (a6); or components (a1), (a2), (a3), (a4) and (a7); or components (a1), (a2), (a3), (a4) and (a8); or components (a1), (a2), (a3), (a5) and (a6); or components (a1), (a2), (a3), (a5) and (a7); or components (a1), (a2), (a3), (a5) and (a8); or components (a1), (a2), (a3), (a6) and (a7); or components (a1), (a2), (a3), (a6) and (a8); or components (a1), (a2), (a3), (a7) and (a8); or components (a1), (a2), (a4), (a5) and (a6); or components (a1), (a2), (a4), (a5) and (a7); or components (a1), (a2), (a4), (a5) and (a8); or components (a1), (a2), (a4), (a6) and (a7); or components (a1), (a2), (a4), (a6) and (a8); or components (a1), (a2), (a4), (a7) and (a8); or components (a1), (a2), (a5), (a6) and (a7); or components (a1), (a2), (a5), (a6) and (a8); or components (a1), (a2), (a5), (a7) and (a8).

Moreover, composition (A) may contain components (a1), (a2), (a3), (a4), (a5) and (a6); or components (a1), (a2), (a3), (a4), (a5) and (a7); or components (a1), (a2), (a3), (a4), (a5) and (a8); or components (a1), (a2), (a3), (a4), (a6) and (a7); or components (a1), (a2), (a3), (a4), (a6) and (a8); or components (a1), (a2), (a3), (a4), (a7) and (a8); or components (a1), (a2), (a3), (a5), (a6) and (a7); or components (a1), (a2), (a3), (a5), (a6) and (a8); or components (a1), (a2), (a3), (a5), (a7) and (a8); or components (a1), (a2), (a3), (a6), (a7) and (a8); or components (a1), (a2), (a4), (a5), (a6) and (a7); or components (a1), (a2), (a4), (a5), (a6) and (a8); or components (a1), (a2), (a4), (a5), (a7) and (a8); or components (a1), (a2), (a4), (a6), (a7) and (a8); or components (a1), (a2), (a5), (a6), (a7) and (a8).

It is also possible, that composition (A) contains components (a1), (a2), (a3), (a4), (a5), (a6), and (a7); or components (a1), (a2), (a3), (a4), (a5), (a6), and (a8); or components (a1), (a2), (a3), (a4), (a5), (a7), and (a8); or components (a1), (a2), (a3), (a4), (a6), (a7), and (a8); or components (a1), (a2), (a3), (a5), (a6), (a7), and (a8); or components (a1), (a2), (a4), (a5), (a6), (a7), and (a8). Composition (A) may also contain all components (a1) to (a8).

The terms "component (a1)", "component (a2)", "component (a3)", "component (a4)", "component (a4)", "component (a5)", "component (a6)", "component (a7)", and "component (a8)" are used as abbreviations of the definition of the general definition of composition (A) and the description of the respective component given above, e.g. said components are present in composition (A) according to the general definitions of composition (A). For example if it is stated that composition (A) contains components (a1), (a2) and (a3) it is intended to mean that composition (A) contains
(a1) based on the total weight of composition (A) at least 60 wt.-% of water or a water containing solvent mixture wherein the solvent mixture contains at least 90 wt.-% of water, based on the total weight of the solvent mixture (a1);
(a2) at least 0.1 mol/m$^3$ of at least one water soluble silicate, and
(a3) at least one molybdate,
wherein mol/m$^3$ are based on the total volume of the composition (A);
and includes that composition (A) contains
(a1) based on the total weight of composition (A) at least 60 wt.-% of water or a water containing solvent mixture wherein the solvent mixture contains at least 90 wt.-% of water, based on the total weight of the solvent mixture (a1);
(a2) 0.1 to 2500 mol/m$^3$ of at least one water soluble silicate, and
(a3) 0.1 to 100 mol/m$^3$ of at least one molybdate,
wherein mol/m$^3$ are based on the total volume of the composition (A).

If composition (A) contains components (a1), (a2), (a3), (a4) and (a5) it is intended to mean that composition (A) contains
(a1) based on the total weight of composition (A) at least 60 wt.-% of water or a water containing solvent mixture wherein the solvent mixture contains at least 90 wt.-% of water, based on the total weight of the solvent mixture (a1);
(a2) at least 0.1 mol/m³ of at least one water soluble silicate,
(a3) at least one molybdate,
(a4) at least one phosphonate, and
(a5) at least one azole,
wherein mol/m³ are based on the total volume of the composition (A);
and includes that composition (A) contains
(a1) based on the total weight of composition (A) at least 60 wt.-% of water or a water containing solvent mixture wherein the solvent mixture contains at least 90 wt.-% of water, based on the total weight of the solvent mixture (a1);
(a2) 0.1 to 2500 mol/m³ of at least one water soluble silicate,
(a3) 0.1 to 100 mol/m³ of at least one molybdate,
(a4) 0.01 to 10 mol/m³ of at least one phosphonate, and
(a5) 0.01 to 100 mol/m³ of at least one azole,
wherein mol/m³ are based on the total volume of the composition (A).

Another possibility is that composition (A) contains components (a1), (a2), (a3), (a4), (a5), (a6) and (a7). In this case composition (A) contains
(a1) based on the total weight of composition (A) at least 50 wt.-% of water or a water containing solvent mixture wherein the solvent mixture contains at least 90 wt.-% of water, based on the total weight of (a1);
(a2) at least 0.1 mol/m³ of at least one water soluble silicate,
(a3) at least one molybdate,
(a4) at least one phosphonate,
(a5) at least one azole,
(a6) at least one additional freezing point depressing salt, and
(a7) at least one phosphate.

For the composition (A) containing components (a1) to (a7) it is preferred if composition (A) contains
(a1) based on the total weight of composition (A) at least 60 wt.-% of water or a water containing solvent mixture wherein the solvent mixture contains at least 90 wt.-% of water, based on the total weight of the solvent mixture (a1);
(a2) 0.1 to 2500 mol/m³ of at least one water soluble silicate,
(a3) 0.1 to 100 mol/m³ of at least one molybdate,
(a4) 0.01 to 10 mol/m³ of at least one phosphonate,
(a5) 0.01 to 100 mol/m³ of at least one azole,
(a6) 150 to 5000 mol/m³ of at least one additional freezing point depressing salt, and
(a7) 0.1 to 100 mol/m³ of at least one phosphate,
wherein mol/m³ are based on the total volume of the composition (A).

Composition (A) may also comprise further customary ingredients, for example dyes, viscosity modifiers, biocides, etc.

According to the invention composition (A) is used as heat carrier medium for magnetocaloric materials selected from compounds of formula (I)

$$(A_yB_{1-y})_{2+u}C_wD_xE_z \qquad (I)$$

where
A is Mn or Co,
B is Fe, Cr or Ni,
C is Ge, As or Si,
D is different from C and is selected from P, B, Se, Ge, Ga, Si, Sn, N, As and Sb,
E may be same or different from C and D and is selected from P, B, Se, Ge, Ga, Si, Sn, N, As and Sb, u is a number in the range from −0.1≤u≤0.1,
y is number in the range of 0<y<1,
w, x are numbers in the range of 0<w, x<1,
z is a number in the range of 0 z<1, and
w+x+z=1.

The term "0<w, x<1" is intended to mean that w and x are independently from each other selected from the range above 0 and below 1.

Preferably the magnetocaloric materials for which composition (A) is used as heat carrier medium are compounds of formula (I) where
A is Mn,
B is Fe,
C Si or As,
D is P,
E may be same or different from C and D and is selected from P, B, Se, Ge, Ga, Si, Sn, N, As and Sb,
u is a number in the range from −0.1≤u≤0.1,
y is number in the range of 0<y<1,
w, x are numbers in the range of 0<w, x<1,
z is a number in the range of 0 z<1, and
w+x+z=1.

In the aforementioned compounds of the general formula (I), D and E are preferably identical or different and are selected from at least one of P, Ge, Si, Sn, As, B and Ga.

The metal-based material of formula (I) is preferably selected from at least quaternary compounds which, as well as Mn, Fe, P additionally comprise Ge or Si or As, or contain additionally Ge and Si, or contain additionally Si and B, or contain additionally Ge and As, or contain additionally Si and As, or contain additionally Ge, Si and As.

Materials particularly suitable in accordance with the invention are described, for example, in WO 2004/068512, WO 2011/083446 and WO 2011/111004.

Especially preferred are compounds of formula (I) wherein A is Mn, B is Fe, C is As and D is P; compounds of formula (I), wherein A is Mn, B is Fe, C is Si and D is P, which optionally contain B; and compounds of formula (I), wherein A is Mn, B is Fe, C is Si and D is P, which optionally contain Ge.

The magnetocaloric materials of formula (I) have preferably the hexagonal crystalline structure of the Fe₂P type.

The magnetocaloric materials of formula (I) may be prepared in any suitable manner. They may be produced by solid phase conversion or liquid phase conversion of the starting elements or starting alloys for the magnetocaloric material, subsequently cooling, optionally pressing, sintering and heat treating in one or several steps under inert gas atmosphere and subsequently cooling to room temperature, or by melt spinning of a melt of the starting elements or starting alloys.

Preferably the starting materials are selected from the respective elements present the magnetocaloric material, e.g. Mn, Fe, P, As, B, Ge, and Si in elemental form, and from the alloys and compounds formed by said elements among each other. Non-limiting examples of such compounds and alloys formed by the elements Mn, Fe, P, B and Si are Mn₂P, Fe₂P, Fe₂Si and Fe₂B.

Solid phase reaction of the starting elements or starting alloys may be performed in a ball mill. For example, suitable amounts of elements present in the magnetocaloric material in elemental form or in the form of preliminary alloys such as Mn₂P, Fe₂P or Fe₂B are ground in a ball mill. Afterwards, the powders are pressed and sintered under a protective gas atmosphere at temperatures in the range from 900 to 1300° C., preferably at about 1100° C., for a suitable time, preferably 1 to 5 hours, especially preferred about 2 hours. After sintering the materials are heat-treated at temperatures in the range from 700 to 1000° C., preferably about 950° C., for suitable periods, for example 1 to 100 hours, more preferably 10 to 30 hours, especially about 20 hours. After cooling down, a second heat treatment is preferably carried out, in the range from 900 to 1300° C., preferably at about 1100° C., for a suitable time, preferably 1 to 30 hours, especially about 20 hours.

Alternatively, the element powders or preliminary alloy powders can be melted together in an induction oven. It is then possible in turn to perform heat treatments as specified above.

Processing via melt spinning is also possible. This allows obtaining a more homogeneous element distribution which leads to an improved magnetocaloric effect; cf. Rare Metals, Vol. 25, October 2006, pages 544 to 549. In the process described there, the starting elements are first induction-melted in an argon gas atmosphere and then sprayed in the molten state through a nozzle onto a rotating copper roller. This is followed by sintering at 1000° C. and slow cooling to room temperature. In addition, reference may be made to U.S. Pat. No. 8,211,326 and US 2011/0037342 for the production.

Preference is given to a process for producing the inventive magnetocaloric materials comprises the following steps
(a) reacting the starting materials in a stoichiometry which corresponds to the magnetocaloric material in the solid and/or liquid phase obtaining a solid or liquid reaction product,
(b) if the reaction product obtained in step (a) is in the liquid phase, transferring the liquid reaction product from step (a) into the solid phase obtaining a solid reaction product,
(c) optionally shaping of the reaction product from step (a) or (b)
(d) sintering and/or heat treating the solid product from step (a), (b) or (c),
(e) quenching the sintered and/or heat treated product of step (d) at a cooling rate of at least 10 K/s, and
(f) optionally shaping of the product of step (e).

According to one preferred embodiment of the present invention step (c) shaping of the reaction product from step (a) or (b) is performed.

In step (a) of the process, the elements and/or alloys which are present in the magnetocaloric material are converted in the solid or liquid phase in a stoichiometry which corresponds to the material. Preference is given to performing the reaction in step a) by combined heating of the elements and/or alloys in a closed vessel or in an extruder, or by solid phase reaction in a ball mill. Particular preference is given to performing a solid phase reaction, which is effected especially in a ball mill. Such a reaction is known in principle; c.f. the documents previously cited. Typically, powders of the individual elements or powders of alloys of two or more of the individual elements which are present in the magnetocaloric material are mixed in pulverized or granular form in suitable proportions by weight. If necessary, the mixture can additionally be ground in order to obtain a microcrystalline powder mixture. This powder mixture is preferably mechanically impacted in a ball mill, which leads to further cold welding and also good mixing, and to a solid phase reaction in the powder mixture.

Alternatively, the elements are mixed as a powder in the selected stoichiometry and then melted. The combined heating in a closed vessel allows the fixing of volatile elements and control of the stoichiometry. Specifically in the case of use of phosphorus, this would evaporate easily in an open system.

Step (a) is preferably performed under inert gas atmosphere.

If the reaction product obtained in step (a) is in the liquid phase, the liquid reaction product from step (a) is transferred into the solid phase obtaining a solid reaction product in step (b).

The reaction is followed by sintering and/or heat treatment of the solid in step (d), for which one or more intermediate steps can be provided. For example, the solid obtained in step (a) can be subjected to shaping in step (c) before it is sintered and/or heat treated.

For example, it is possible to send the solid obtained from the ball mill to a melt spinning process. Melt-spinning processes are known per se and are described, for example, in Rare Metals, Vol. 25, October 2006, pages 544 to 549, and also in U.S. Pat. No. 8,211,326 and WO 2009/133049. In these processes, the composition obtained in step (a) is melted and sprayed onto a rotating cold metal roller. This spraying can be achieved by means of elevated pressure upstream of the spray nozzle or reduced pressure downstream of the spray nozzle. Typically, a rotating copper drum or roller is used, which can additionally optionally be cooled. The copper drum preferably rotates at a surface speed of 10 to 40 m/s, especially from 20 to 30 m/s. On the copper drum, the liquid composition is cooled at a rate of preferably from $10^2$ to $10^7$ K/s, more preferably at a rate of at least $10^4$ K/s, especially with a rate of from 0.5 to $2*10^6$ K/s.

The melt spinning, like the reaction in step (a), can be performed under reduced pressure or under an inert gas atmosphere.

The melt spinning achieves a high processing rate, since the subsequent sintering and heat treatment can be shortened. Specifically on the industrial scale, the production of the magnetocaloric materials thus becomes significantly more economically viable. Melt spinning also leads to a high processing rate. Particular preference is given to performing melt spinning.

Melt spinning can be performed to transfer the liquid reaction product obtained from step (a) into a solid according to step (b), too. According to one embodiment of the present invention one of step (a) and (b) comprise melt spinning.

Alternatively, in step (b), spray cooling can be carried out, in which a melt of the composition from step (a) is sprayed into a spray tower. The spray tower may, for example, additionally be cooled. In spray towers, cooling rates in the range from $10^3$ to $10^5$ K/s, especially about $10^4$ K/s, are frequently achieved.

In step (c) optionally shaping of the reaction product of step (a) or (b) is performed. Shaping of the reaction products may be performed by the shaping methods known to the person skilled in the art like pressing, molding, extrusion etc.

Pressing can be carried out, for example, as cold pressing or as hot pressing. The pressing may be followed by the sintering process described below.

In the sintering process or sintered metal process, the powders of the magnetocaloric material are first converted to the desired shape of the shaped body, and then bonded to one another by sintering, which affords the desired shaped body. The sintering can likewise be carried out as described below.

It is also possible in accordance with the invention to introduce the powder of the magnetocaloric material into a polymeric binder, to subject the resulting thermoplastic molding material to a shaping, to remove the binder and to sinter the resulting green body. It is also possible to coat the powder of the magnetocaloric material with a polymeric binder and to subject it to shaping by pressing, if appropriate with heat treatment.

According to the invention, it is possible to use any suitable organic binders which can be used as binders for magnetocaloric materials. These are especially oligomeric or polymeric systems, but it is also possible to use low molecular weight organic compounds, for example sugars.

The magnetocaloric powder is mixed with one of the suitable organic binders and filled into a mold. This can be done, for example, by casting or injection molding or by extrusion. The polymer is then removed catalytically or thermally and sintered to such an extent that a porous body with monolith structure is formed.

Hot extrusion or metal injection molding (MIM) of the magnetocaloric material is also possible, as is construction from thin sheets which are obtainable by rolling processes. In the case of injection molding, the channels in the monolith have a conical shape, in order to be able to remove the moldings from the mold. In the case of construction from sheets, all channel walls can run in parallel.

Steps (a) to (c) are followed by sintering and/or heat treatments of the solid, for which one or more intermediate steps can be provided.

The sintering and/or heat treatments of the solid is effected in step (d) as described above. In the case of use of the melt-spinning process, the period for sintering or heat treatments can be shortened significantly, for example toward periods from 5 minutes to 5 hours, preferably from 10 minutes to 1 hour. Compared to the otherwise customary values of 10 hours for sintering and 50 hours for heat treatment, this results in a major time advantages. The sintering/heat treatment results in partial melting of the particle boundaries, such that the material is compacted further.

The melting and rapid cooling comprised in steps (a) to (c) thus allows the duration of step (d) to be reduced considerably. This also allows continuous production of the magnetocaloric materials.

The sintering and/or heat treatment of the compositions obtained from one of steps (a) to (c) is effected in step (d). The maximal temperature of the sintering (T<melting point) is a strong function of composition. Extra Mn decreases the melting point and extra Si increases it. Preferably the compositions are first sintered at a temperature in the range from 800 to 1400° C., more preferred in the range from 900 to 1300° C. For shaped bodies/solids, the sintering is more preferably effected at a temperature in the range from 1000 to 1300° C., especially from 1000 to 1200° C. The sintering is performed preferably for a period of from 1 to 50 hours, more preferably from 2 to 20 hours, especially from 5 to 15 hours (step d1). After sintering the compositions are preferably heat treated at a temperature in the range of from 500 to 1000° C., preferably in the range of from 700 to 1000° C., but even more preferred are the aforementioned temperature ranges outside the range of 800 to 900° C., i.e the heat treatment is preferably performed at a temperature T wherein 700° C. <T<800° C. and 900° C. <T<1000° C. The heat treatment is performed preferably for a period in the range from 1 to 100 hours, more preferably from 1 to 30 hours, especially from 10 to 20 hours (step d2). This heat treatment may then be followed by a cool down to room temperature, which is preferably carried out slowly (step d3). An additional second heat treatment may be carried out at temperatures in the range of from 900 to 1300° C., preferably in the range from 1000 to 1200° C. for a suitable period like, preferably 1 to 30 hours, preferably 10 to 20 hours (step d4).

The exact periods can be adjusted to the practical requirements according to the materials. In the case of use of the melt-spinning process, the period for sintering or heat treatment can be shortened significantly, for example to periods from 5 minutes to 5 hours, preferably from 10 minutes to 1 hour. Compared to the otherwise customary values of 10 hours for sintering and 50 hours for heat treatment, this results in a major time advantage.

The sintering/heat treatment results in partial melting of the particle boundaries, such that the material is compacted further.

The melting and rapid cooling in step (b) or (c) thus allows the duration of step (d) to be reduced considerably. This also allows continuous production of the magnetocaloric materials.

Preferably step (d) comprises the steps
(d1) sintering,
(d2) first heat treatment,
(d3) cooling, and
(d4) second heat treatment.

Steps (d1) to (d4) may be performed as described above.

In step (e) quenching the sintered and/or heat treated product of step (d) at a cooling rate of at least 10 K/s, preferably of at least 100 K/s is performed. The thermal hysteresis and the transition width can be reduced significantly when the magnetocaloric materials are not cooled slowly to ambient temperature after the sintering and/or heat treatments, but rather are quenched at a high cooling rate. This cooling rate is at least 10 K/s, preferably at least 100 K/s.

The quenching can be achieved by any suitable cooling processes, for example by quenching the solid with water or aqueous liquids, for example cooled water or ice/water mixtures. The solids can, for example, be allowed to fall into ice-cooled water.

It is also possible to quench the solids with subcooled gases such as liquid nitrogen. Further processes for quenching are known to those skilled in the art. The controlled and rapid character of the cooling is advantageous especially in the temperature range between 800 and 900° C., i.e. it is preferred to keep the exposure of the material to temperatures in the range between 800 and 900° C. as short as possible.

The rest of the production of the magnetocaloric materials is less critical, provided that the last step comprises the quenching of the sintered and/or heat treated solid at the large cooling rate.

In step (f) the product of step (e) may be shaped. The product of step (e) may be shaped by any suitable method known by the person skilled in the art, e.g. by bonding with epoxy resin or any other binder. Performing shaping step (f) is especially preferred if the product of step (e) is obtained in form of a powder or small particles.

According to the invention composition (A) is used as heat carrier medium for the magnetocaloric materials of formula (I) described above, wherein the heat carrier medium is in direct contact with the magnetocaloric materials. "In direct contact" means that no barrier is present to prevent the contact of fluid heat carrier medium and magnetocaloric material or that any barrier present is not preventing the corrosion of the material in contact with water due to its permeability for corroding species and/or its only partial-coverage of the surface. This has the advantage, that the heat transfer between magnetocaloric material and heat transfer fluid is not hindered. Since composition (A) contains water as main solvent, it has a high heat capacity and a low viscosity, both properties are beneficial in respect to a fast and efficient heat transfer and low pressure drop within the pumping circle of the heat carrier medium in comparison to heat carrier media based organic solvents like polyglycols etc.

The magnetocaloric materials are preferably part of a magnetic cooling system like refrigeration systems and climate control units, of a magnetic heat pump or of a magnetic generator. For a description of customary magnetic coolers, magnetic heat pumps or magnetic generators, reference may be made to the literature mentioned at the outset. In addition, WO 2006/074790 can be cited for a description of a magnetic regenerator. The magnetocaloric material may be used in any shape, which is suited for a fast and efficient heat transfer, i.e. the magnetocaloric material may be a packed bed of particles flushed by the heat transfer medium or a shaped body containing channels to let the heat transfer medium flow through.

The invention also relates to refrigeration systems, climate control units, heat pumps and magnetocaloric generators comprising (A) at least one composition (A) as described in detail above as heat carrier medium, and
(B) at least one magnetocaloric material selected from compounds of the general formula (I)

$$(A_yB_{1-y})_{2+u}C_wD_xE_z \quad (I)$$

where
A is Mn or Co,
B is Fe, Cr or Ni,
C is Ge, As or Si,
D is different from C and is selected from P, B, Se, Ge, Ga, Si, Sn, N, As and Sb,
E may be same or different from C and D and is selected from P, B, Se, Ge, Ga, Si, Sn, N, As and Sb,
u is a number in the range from −0.1 to 0.1,
y is number in the range of 0<y<1,
w, x are numbers in the range of 0<w, x<1,
z is a number in the range of 0 z<1, and
w+x+z=1;
wherein the composition (A) is in direct contact with the magnetocaloric material.

The different properties of a heat transfer medium and its interplay with the materials and devices it is used with may be investigated by different methods. E.g. the corrosion stability of magnetocaloric material in different fluids, such as pure water, pure solvents, solutions of different salts, organic compounds and especially heat transfer fluids according to the composition (A) described above can be tested in the following way: Plates, pieces, or particles of a magnetocaloric material are immersed in a heat transfer fluid. Discoloration of the plates, pieces, or particles is monitored over time. In case of corrosion, colored oxides become visible on the surface of the material. Corrosion products can be detected on the surface using X-ray photoelectron spectroscopy (XPS). The heat transfer fluid can be analyzed for its elemental composition to detect dissolved species of the magnetocaloric material or soluble corrosion products. The elemental analysis can, e.g., be tested using (inductively coupled plasma) atomic absorption spectroscopy, atomic emission spectroscopy or mass spectrometry. Studying the electrochemical potential of magnetocaloric materials in contact with heat transfer fluid can be used to compare the corrosion inhibition potential of different heat transfer fluids, since it provides information about the predominant electrochemical reactions in the system. The viscosity of a heat transfer fluids can be measured by means of viscometers or rheometers. This information can be used to estimate pumping losses due to the associated pressure drop with a heat transfer fluid. The freezing point depression can be determined by thermal analyses like differential scanning calorimetry (DSC) or differential thermal analysis (DTA).

The invention is illustrated in detail by the examples which follow.

EXAMPLES

Example 1

The corrosion of MnFePSi was tested in different heat carrier media. Platelets (size ca. 1 to 2 cm², total mass ca. 1 to 2 g) of $Mn_{1.24}Fe_{0.71}P_{0.48}Si_{0.52}$ were fully immersed in 50 mL of the following fluids:
a) deionized water (non-inventive), pH=6.5 to 7.0
b) 0.533 mol/m³ tolyltriazole in deionized water (non-inventive), pH=9.8,
c) 2.271 mol/m³ sodium silicate in deionized water (inventive), pH=10.4,
d) 0.802 mol/m³ sodium molybdate dihydrate in deionized water (non-inventive), pH=8,
e) 0.673 mol/m³ 2-hydroxy phosphonoacetic acid in deionized water (non-inventive), pH=8.6.

After 13 days of immersion of the platelets in the different fluids at room temperature, all platelets except for the ones in 2.271 mol/m³ sodium silicate (inventive example 1c)) showed discoloration on the platelet surface. The discolorations on the other platelets ranged from light brown to brown to dark brown and black as well as a dark blue appearance. In all non-inventive examples 1a), b), d) and e) a mixture of different discolorations was observed.

Examples 2-1 to 2-8

The corrosion of MnFePSi was tested in different heat carrier media. Granulates (particle size 300-425 μm, total mass 2 g per sample) of $Mn_{1.26}Fe_{0.69}P_{0.48}Si_{0.52}$ were fully immersed in 30 mL of different heat carrier media consisting of deionized water and different additives. The immersed samples were kept on a plate vibrator for 12 days at room temperature. The concentration of Fe, Mn, P and Si in the heat carrier media after the twelve days was determined via inductively coupled plasma optical emission spectrometry (ICP-OES). The concentrations of the different additives in the deionized water and the concentration of Fe, Mn, P and Si determined in the heat carrier media after twelve days are shown in Table 1.

TABLE 1

| | Additives | | Fe [mg/kg] | Mn [mg/kg] | P [mg/kg] | Si [mg/kg] |
|---|---|---|---|---|---|---|
| 2-1 | 2.3 mol/m³ sodium orthosilicate pH: 11.38 | inventive | <1 | <1 | <3 | 90 |
| 2-2 | 0.8 mol/m³ sodium molybdate dihydrate pH: 9.6 | non-inventive | <1 | 4 | 3 | 4 |
| 2-3 | 2.3 mol/m³ sodium phosphate pH: 9.65 | non-inventive | <1 | 1 | 65 | 14 |
| 2-4 | 2.3 mol/m³ sodium nitrate pH: 9.65 | non-inventive | <1 | 4 | 9 | 4 |

TABLE 1-continued

| | Additives | | Fe [mg/kg] | Mn [mg/kg] | P [mg/kg] | Si [mg/kg] |
|---|---|---|---|---|---|---|
| 2-5 | 2.3 mol/m³ sodium orthosilicate + 0.8 mol/m³ sodium molybdate dihydrate pH: 11.5 | inventive | <1 | <1 | <3 | 95 |
| 2-6 | 2.3 mol/m³ sodium orthosilicate + 2.3 mol/m³ sodium phosphate pH: 10.3 | inventive | <1 | 1 | 55 | 95 |
| 2-7 | 2.3 mol/m³ sodium orthosilicate + 2.3 mol/m³ sodium nitrate pH: 11.6 | inventive | <1 | <1 | <3 | 85 |
| 2-8 | 2.3 mol/m³ sodium orthosilicate + 0.8 mol/m³ sodium molybdate dihydrate + 0.5 mol/m³ 1H-benzotriazole + 2.3 mol/m³ sodium phosphate pH: 11.6 | inventive | <1 | <1 | 55 | 85 |

The sign "<" means, that the concentration was below the limit of detection.

The results in Table 1 show that sodium orthosilicate is more effective in reducing the leaching of Mn, Fe and P from the magnetocaloric material than sodium molybdate dihydrate, sodium phosphate and sodium nitrate alone. The inventive heat carrier media containing sodium orthosilicate and additional additives like sodium molybdate dihydrate, sodium phosphate and sodium nitrate show better results than compositions containing the additional additives alone, too. This is a very beneficial effect, since in a magnetocaloric cooling device the heat carrier medium usually flows through a tube and pumping system which is made from different materials than the magnetocaloric material. The inventive heat carrier media for magnetocaloric materials allow the adjustment of their composition to the materials of the pump and piping system if needed without detrimental effect on the magnetocaloric materials.

The invention claimed is:

1. A method, comprising contacting a magnetocaloric material with a heat carrier medium adapted to transfer thermal energy to or from the magnetocaloric material, wherein:
the heat carrier medium comprises a composition (A) having a pH of at least 8 at 25° C. and comprising
(a1) at least 50 wt.-% of water or an aqueous solvent mixture comprising at least 90 wt.-% of water based on a total weight of (a1), based on a total weight of composition (A), and
(a2) 0.1 mol/m³ to 10 mol/m³ of at least one water soluble silicate,
(a3) optionally at least one molybdate,
(a4) optionally at least one phosphonate,
(a5) optionally at least one azole,
(a6) optionally at least one additional freezing point depressing salt,
(a7) optionally at least one phosphate, and
(a8) optionally at least one nitrate,
units of mol/m³ being based on a total volume of the composition (A);
the magnetocaloric material comprises a compound of formula (I):

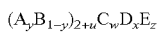 (I)

A is Mn;
B is Fe;
C Si or As;
D is P;
E is the same or different from C and D and is selected from the group consisting of P, B, Se, Ge, Ga, Si, Sn, N, As and Sb;
u is a number in the range from −0.1≤u≤0.1;
y is number in the range of 0<y<1;
w, x are numbers in the range of 0<w, x<1;
z is a number in the range of 0≤z<1; and
w+x+z=1.

2. The method according to claim 1, wherein the overall concentration of components (a2), (a3), (a4), (a5), (a6), (a7), and (a8) in composition (A) is at least 150 mol/m³.

3. The method according to claim 1, wherein the aqueous solvent mixture is a mixture of water with one or more solvent comprising a water miscible $C_{1-6}$-alkanol, $C_{1-6}$-alkanolamine, $C_{2-6}$-alkanediol or polyol having an aliphatic hydrocarbon radical with 3 to 6 hydroxyl groups.

4. The method according to claim 1, wherein the composition (A) has a pH at 25° C. in the range of 9 to 11.

5. The method according to claim 1, wherein the silicate (a2) is selected from the group consisting of $Na_2O.nSiO_2$, $K_2O.nSiO_2$, $Li_2O.nSiO_2$, $Rb_2O.nSiO_2$, and $Cs_2O.nSiO_2$ with 1≤n≤4, in which the silicates may be hydrated.

6. The method according to claim 1, wherein composition (A) comprises at least 0.1 mol/m³ of at least one molybdate (a3).

7. The method according to claim 6, wherein the at least one molybdate (a3) is selected from the group consisting of $Na_2MoO_4$, $K_2MoO_4$, $Li_2MoO_4$, $Rb_2MoO_4$, $Cs_2MoO_4$, $MgMoO_4$, and an ammoniummolybdate.

8. The method according to claim 1, wherein the composition (A) comprises at least 0.01 mol/m³ of at least one phosphonate (a4).

9. The method according to claim 8, wherein the at least one phosphonate (a4) is selected from the group consisting of 2-hydroxy phosphonoacetic acid, 2-phosphonobutane-1, 2,4-tricarboxylie acid, amino tris(methylene phosphonic acid), and 1-hydroxyethylidene-1,1-diphosphonic acid.

10. The method according to claim 1, wherein the composition (A) comprises at least 0.01 mol/m³ of at least one azole (a5).

11. The method according to claim 10, wherein the at least one azole (a5) is selected from the group consisting of tolyltriazole; 1,2,3-benzotriazole; 1H-benzotriazole, 6(or 7)-methyl-, sodium salt (1:1); 2-mercaptobenzothiazole; and sodium salt of 2-mercaptobenzothiazole.

12. The method according to claim 1, wherein the composition (A) comprises at least 150 mol/m³ of at least one freezing point depressing salt (a6).

13. The method according to claim 12, wherein the at least one additional freezing point depressing salt (a6) is selected from the group consisting of sodium acetate, potassium acetate, sodium formate, potassium formate, sodium adipate and potassium adipate.

14. The method according to claim 1, wherein the composition (A) comprises at least 0.1 mol/m³ of at least one phosphate (a7) selected from the group consisting of an orthophosphate, a pyrophosphate and a polyphosphate.

15. The method according to claim 14, wherein the at least one phosphate (a7) is
an orthophosphate selected from the group consisting of $Zn_3(PO_4)_2$, $Na_3PO_4$, $Na_2HPO_4$, $NaH_2PO_4$, $K_3PO_4$, $K_2HPO_4$, $KH_2PO_4$, $(NH_4)_3PO_4$, $(NH_4)_2HPO_4$, $(NH_4)H_2PO_4$ and $H_3PO_4$, a pyrophosphate selected from the group consisting of sodium pyrophosphate and potassium pyrophosphate, or are sodium hexametaphosphate.

16. The method according to claim 1, wherein the composition (A) comprises at least 0.1 mol/m³ of at least one nitrate (a8).

17. The method according to claim 16, wherein the at least one nitrate (a8) is selected from the group consisting of $LiNO_3$, $NaNO_3$, $KNO_3$, $RbNO_3$, $NH_4NO_3$, $Mg(NO_3)_2$, $Ca(NO_3)$, $Sr(NO_3)_2$, and $Zn(NO_3)_2$.

18. The method according to claim 1, wherein the composition (A) comprises
   (a1) at least 60 wt.-% of the water or then aqueous solvent mixture comprising at least 90 wt.-% of water based on a total weight of (a1), based on the total weight of composition (A), and
   (a2) 0.1 mol/m³ to 10 mol/m³ of the at least one water soluble silicate,
   (a3) 0.1 to 100 mol/m³ of at least one molybdate.

19. The method according to claim 1, wherein the composition (A) comprises
   (a1) at least 60 wt.-% of the water or then aqueous solvent mixture comprising at least 90 wt.-% of water based on a total weight of (a1), based on the total weight of composition (A), and
   (a2) 0.1 mol/m³ to 10 mol/m³ of the at least one water soluble silicate,
   (a3) 0.1 to 100 mol/m³ of at least one molybdate,
   (a4) 0.01 to 10 mol/m³ of at least one phosphonate, and
   (a5) 0.01 to 100 mol/m³ of at least one azole.

20. A system, comprising a magnetocaloric material of formula (I) and a composition (A) as heat carrier medium being in direct contact with the magnetocaloric material:

$$(A_yB_{1-y})_{2+u}C_wD_xE_z \qquad (I),$$
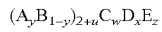

wherein:
A is Mn;
B is Fe;
C Si or As;
D is P;
E is the same or different from C and D and is selected from the group consisting of P, B, Se, Ge, Ga, Si, Sn, N, As and Sb;
u is a number in the range from $-0.1 \leq u \leq 0.1$;
y is number in the range of $0 < y < 1$;
w, x are numbers in the range of $0 < w, x < 1$;
z is a number in the range of $0 \leq z < 1$;
$w+x+z=1$; and
the heat carrier medium comprises a composition having a pH of at least 8 at 25° C. and comprising
   (a1) at least 50 wt.-% of water or an aqueous solvent mixture comprising at least 90 wt.-% of water based on a total weight of (a1), based on a total weight of composition (A), and
   (a2) 0.1 mol/m³ to 10 mol/m³ of at least one water soluble silicate,
   (a3) optionally at least one molybdate,
   (a4) optionally at least one phosphonate,
   (a5) optionally at least one azole,
   (a6) optionally at least one additional freezing point depressing salt,
   (a7) optionally at least one phosphate, and
   (a8) optionally at least one nitrate,
units of mol/m³ being based on a total volume of the composition (A).

21. The system according to claim 20, wherein the overall concentration of components (a2), (a3), (a4), (a5), (a6), (a7), and (a8) in composition (A) is at least 150 mol/m³.

* * * * *